US006683137B2

(12) United States Patent
Kida et al.

(10) Patent No.: US 6,683,137 B2
(45) Date of Patent: Jan. 27, 2004

(54) INTERMEDIATE COATING COMPOSITION, METHOD FOR FORMING MULTILAYERED COATING FILMS AND MULTILAYERED COATING FILMS

(75) Inventors: Masuo Kida, Urayasu (JP); Yasuo Tanaka, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 10/177,847

(22) Filed: Jun. 21, 2002

(65) Prior Publication Data

US 2003/0008161 A1 Jan. 9, 2003

(30) Foreign Application Priority Data

Jun. 22, 2001 (JP) ........................................ 2001-189136

(51) Int. Cl.[7] ................. B32B 27/36; C08G 63/02; C08G 63/08; C08G 63/12; C08G 63/16
(52) U.S. Cl. ................ 525/444; 525/437; 525/441; 525/443; 427/407.1; 428/480; 428/482
(58) Field of Search ................. 428/480, 482; 525/437, 444, 441, 443; 427/407.1

(56) References Cited

U.S. PATENT DOCUMENTS

| 4,501,829 | A | * | 2/1985 | Oda et al. ................. 523/400 |
| 4,731,422 | A | * | 3/1988 | Tanabe et al. .............. 525/437 |
| 5,460,892 | A |   | 10/1995 | Bederke et al. |
| 5,852,120 | A | * | 12/1998 | Bederke et al. ............. 525/124 |
| 6,423,771 | B1 | * | 7/2002 | Dworak et al. ............. 524/501 |

FOREIGN PATENT DOCUMENTS

| JP | A-5-262869 | 10/1993 |
| JP | 06-108008 | 4/1994 |
| JP | A-9-241580 | 9/1997 |
| JP | 11-335621 | 12/1999 |

* cited by examiner

*Primary Examiner*—Vivian Chen
(74) *Attorney, Agent, or Firm*—Pennie & Edmonds LLP

(57) ABSTRACT

In an intermediate coating composition comprising high-acid-value polyester resin, low-acid-value polyester resin, melamine resin containing an imino group and pigments, a ratio $(AV_1/AV_2)$ of acid value $(AV_1)$ of high-acid-value polyester resin to that $(AV_2)$ of low-acid-value polyester resin is adjusted to be 1.25–5. A method for forming multilayered coating films using this intermediate coating composition and multilayered coating films prepared using said method are provided, wherein, by specifying the acid value of resins and type of cross-linking agents in the intermediate coating, said multilayered coating films formed even under short-time baking conditions is excellent in its appearance and adhesiveness to the top coating, and said intermediate coating composition is able to maintain its storage stability excellent so as to be capable of shortening the coating processes.

10 Claims, No Drawings

INTERMEDIATE COATING COMPOSITION, METHOD FOR FORMING MULTILAYERED COATING FILMS AND MULTILAYERED COATING FILMS

BACKGROUND OF THE INVENTION

1. Field of the Invention

The present invention relates to an intermediate coating composition which not only allows shortening a period of baking but also has an excellent appearance and good adhesion thereof to a top coating film, a method for forming multilayered coating films, and multilayered coating films.

2. Description of Related Art

Multilayered coating films have been conventionally formed on metallic base materials to be coated to provide corrosion-resistance as well as excellent appearance. In the automobile coating, one method comprises applying a thermosetting intermediate coating and baking it, successively applying a thermosetting top coat base coating on said baked intermediate coating without baking the top coat base coating, and applying a thermosetting top coat clear coating by wet-on-wet, and then simultaneously curing the top coat base coating and top clear coating. In another method, a thermosetting top coat solid coating is applied to said baked intermediate coating film and cured by baking.

Furthermore, in the automobile line for coating, in spite of requests for minimizing the baking period as much as possible to improve efficiency of the coating process, most of the automobile line for intermediate coating has been operated at 140° C. for 30 minute at present.

Although development of an intermediate coating has been in progress which is durable to the automobile line for intermediate coating under baking conditions at 140° C. for 15 minute, coating conditions unfavorably affect the appearance of coating film and adhesion to the top coating.

SUMMARY OF THE INVENTION

An object of the present invention is to provide an intermediate coating composition, a method for forming multilayered coating films and multilayered coating films, wherein, by specifying the acid value and cross linking agent of said intermediate coating resin, multilayered coating films can have an excellent appearance and good adhesion to the top coating under brief baking conditions. Moreover, said intermediate coating composition is capable of retaining the storage stability, so that the coating process can be shortened.

In view of the aforementioned problems, the present inventors have actively pursued studies to achieve the present invention as follows:

1. An intermediate coating composition comprising a high-acid-value polyester resin, low-acid-value polyester resin, melamine resin containing imino groupsand pigment, wherein the ratio ($AV_1/AV_2$) of the acid value of a high-acid-value polyester resin ($AV_1$) to that ($AV_2$) of a low-acid-value polyester resin is in the range of 1.25–5.0.

2. The intermediate coating composition being free of an acid catalyst for promoting reaction of said melamine resin with said high-acid-value polyester resin and said low-acid-value polyester resin.

3. The intermediate coating composition, wherein the weight ratio (P1/P2) of said high-acid-value polyester resin (P1) to said low-acid-value polyester resin (P2) is as follows: P1/P2=30/70–90/10.

4. The intermediate coating composition wherein said high-acid-value polyester resin has a number-average molecular weight in the range of 2,000–4,000, hydroxyl group value in the range of 90–120, and acid value in the range of 15–40.

5. The intermediate coating composition wherein said high-acid-value polyester resin is a lactone-modified polyester resin, the lactone content in said lactone-modified polyester resin being in the range of 10–30 percent by weight as converted to solid portions.

6. The intermediate coating composition wherein said low-acid-value polyester resin has a number-average molecular weight in the range of 2,000–4,000, a hydroxyl group value in the range of 90–120, and an acid value in the range of 5–12.

7. The intermediate coating composition wherein said melamine resin containing an imino group is a methyl/butyl mixed alkylated melamine resin containing high iminogroups, methylated melamine resin containing high imino groups or butylated melamine resin containing high imino groups.

8. The intermediate coating composition wherein the melamine resin contains 50–100 percent by solid weight of a methyl/butyl mixed alkylated melamine resin containing high imino-groups.

9. A method for forming multilayered coating films, comprising the steps of:

forming the intermediate coating composition on an undercoated base material; and forming a top coating.

10. Multilayered coating films obtained by said method for forming multilayered coating films.

DETAILED DESCRIPTION OF THE INVENTION

The composition of the present invention will be described below in more detail.

Intermediate Coating Composition

One embodiment of an intermediate coating composition according to the present invention is an intermediate coating composition comprising a high-acid-value polyester resin, a low-acid-value polyester resin, a melamine resin containing an imino group and a pigment, wherein a ratio ($AV_1/AV_2$) of the acid value ($AV_1$) of the high-acid-value polyester resin to the acid value ($AV_2$) of the low-acid-value polyester resin is adjusted to be in the range of 1.25–5 so as to minimize a baking period in the automobile line for intermediate coating and to provide an excellent appearance and adhesion to the top coating on the intermediate coating. In the following, specific construction as well as operation and effects of the intermediate coating composition will be described.

A resin which is a condensation product of polyalcohol with polycarboxylic acid is used as the polyester resin. The resin also includes an alkyd resin obtained by adding components for providing fatty acid residues derived from natural drying oil or semi-drying oil. These resins contain free hydroxyl and carboxyl groups in a predetermined proportion which allow reactions with a standard cross-linking agent.

Polyalcohols suitable for manufacturing polyester resins include ethylene glycol, propylene glycol, butylene glycol, 1,6-hexylene glycol, neopentyl glycol, glycerol, trimethylolpropane, trimethylolethane, pentaerythritol, dipentaerythritol, tripentaerythritol, hexanetriol and condensation products of trimethylolpropane and ethylene oxide or propylene oxide.

Appropriate carboxylic acids include succinic acid (or anhydride thereof), adipic acid, azelaic acid, sebacic acid, maleic acid (or anhydride thereof), fumaric acid, mucoic acid, itaconic acid, phthalic acid (or anhydride thereof), isophthalic acid, terephthalic acid, trimellitic acid (or anhydride thereof) and pyromellitic acid (or anhydride thereof), also including fatty acids derived from natural drying oils or semi-drying oils such as linseed oil, soybean oil, tall oil, dehydrated castor oil, fish oil and tung oil, and those derived from safflower oil, sunflower oil and cottonseed oil. Usually, oil length of such alkyd resins does not preferably exceed 50%. For the purpose of providing plasticity on polyesters, monofunctional saturated carboxylic acids may be further combined therewith. Examples of these carboxylic acids may include $C_4$–$C_{20}$ saturated fatty acids, benzoic acids, p-tertiary butyl benzoate and abietic acid.

An intermediate coating composition of the present invention is characterized in that the acid values of polyester resins thereof are set to have a specific ratio between the high-acid-value polyester resin (P1) and the low-acid-value polyester resin (P2) present in the composition, and the acid values can be controlled by adjusting an amount of terminal carboxyl groups.

The specific ratio is a ratio ($AV_1/AV_2$) of the acid value ($AV_1$) of the high-acid-value polyester resin (P1) to the acid value ($AV_2$) of the low-acid-value polyester resin (P2), being in the range of 1.25–5. When this ratio is less than 1.25, curing becomes insufficient. In contrast, when the ratio exceeds 5, appearance of intermediate coating and adhesiveness thereof to a top coating become insufficient because of excessive curing. Preferably, the ratio is in the range of 1.5–3.5.

The high-acid-value polyester resin (P1) preferably has a number-average molecular weight in the range of 2000–4000, a hydroxyl value in the range of 90–120, and an acid value in the range of 15–40. When the number-average molecular weight is out of the range, functions and appearance of coatings may become unsatisfactory. The molecular weight is further preferably in the range of 2500–3500. When the hydroxyl group value is less than 90, there is a risk that adhesiveness of coating becomes insufficient. In contrast, when the value exceeds 120, curing may become insufficient. Further preferably, the value is in the range of 90–100. When the acid value is less than 15, curing may become insufficient. In contrast, when it exceeds 40, appearance and adhesiveness of coating may become unsatisfactory because of excessive curing. Further preferably, the acid value is in the range of 20–30.

On the other hand, the low-acid-value polyester resin (P2) preferably has a number-average molecular weight in the range of 2000–4000, a hydroxyl group value in the range of 90–120, and an acid value in the range of 5–12. When the number-average molecular weight is out of the range, functions and appearance of coating may become unsatisfactory. Further preferably, the molecular weight is in the range of 2500–3500. When the hydroxyl group value is less than 90, there is a risk that adhesiveness of coating becomes insufficient. In contrast, when it exceeds 120, curing may become insufficient. Further preferably, the value is in the range of 90–100. When the acid value is out of the range of 5–12, stability and performance of the coating may become insufficient. Further preferably, the acid value is in the range of 8–12.

Furthermore, a preferable weight ratio (P1)/(P2) of the high-acid-value polyester rein (P1) to the low-acid-value polyester resin (P2) is as follows: (P1)/(P2)=30/70–90/10.

When this ratio is less than 30/70, curing may become insufficient. In contrast, when it exceeds 90/10, appearance and adhesiveness of the coating may become inadequate because of excessive stability and curing of coating. Further preferably, the ratio is in the range of 40/60–60/40.

In addition, the high-acid-value polyester resin (P1) is preferably a lactone modified polyester resin, wherein the content of modifying lactone in the lactone-modified polyester resin is preferred to be in the range of 10–30 percent by solid weight converted as a solid portion. When the content is less than 10 percent by solid weight, flexibility of the coating is hardly sufficient, and may become inadequate when chipping resistance is required. In contrast, when the content exceeds 30 percent by solid weight, coating hardness may become insufficient because of excessive flexibility of the coating. Further preferably, the content is 15–25 percent by weight. Lactone-modified polyester resin is improved in the chipping resistance thereof by modifying repeated ester linkages produced using polycarboxylic acids and polyalcohols with lactones having 6–8 carbon atoms. As a modifying lactone, butyrolactone, $\delta$-valerolactone, $\beta$-methyl-$\delta$-valerolactone, $\epsilon$-caprolactone, $\zeta$-enantholactone, $\eta$-caprolactone, or ring substituted derivatives, namely, a heterocycle containing ring carbon atoms wherein at least one carbon atom having a substituent etc. can be used singly or in combinations of two species or more thereof. In this case, $\epsilon$-caprolactone is preferably used.

As a cross-linking agent used in the intermediate coating composition, the melamine resin containing an imino group is used. As the melamine resin containing an imino group, a methyl/butyl mixed alkylated melamine resin containing high imino groups, methylated melamine resin containing high imino groups or butylated melamine resin containing high imino groups can be used.

Further preferably, the methyl/butyl mixed alkylated melamine resin containing high imino groups is contained in the melamine resin at 50–100 percent by solid weight.

In this case, in the intermediate coating composition, the melamine resin, the high-acid-value polyester resin and the low-acid-value polyester resin are used as a vehicle, thereby eliminating necessity to include an acid catalyst ordinarily used as a curing promoter for a polyester resin and a melamine resin.

Contents of the polyester resin and the cross-linking agent are 90–50 percent by weight for the polyester resin and 10–50 percent by weight for the cross-linking agent, preferably 85–60 percent by weight for the former and 15–40 percent by weight for the latter. When the content of the cross-linking agent is less than 10 percent by weight (when the content of polyester resin exceeds 90 percent by weight), cross-linkage in the coating may not be sufficient. On the other hand, when the content of the cross-linking agent exceeds 50 percent by weight (when the content of the polyester resin is less than 50 percent by weight), not only the storage stability of the coating composition is reduced but also the curing speed thereof is enhanced, so that the appearance of coating may become deteriorated. An amount of blending, a blending ratio and an amount of added components in the present specification represent an amount calculated as solid mass unless otherwise specified unless recited otherwise.

The intermediate coating composition may contain a variety of pigments. Examples of coloring pigments include organic pigments such as azo-lake pigments, phthalocyanine pigments, indigo pigments, perylene pigments, quinophthalone pigments, dioxazine pigments, quinacridone pigments, isoindolinone pigments, metallic complexes, etc., and inorganic pigments such as yellow iron oxide, red iron oxide, titanium dioxide, carbon black, etc.

Furthermore, examples of sheen pigments are aluminum flake pigments, coloring aluminum flake pigments, metal oxide-coated alumina flake pigments, interfering mica pigments, coloring mica pigments, metal oxide-coated glass flake pigments, metal-plated glass flake pigments, metal oxide-coated silica flake pigments, metallic titanium flake pigments, graphite pigments, stainless flake pigments, plate iron oxide pigments, phthalocyanine flake pigments, hologram pigments, etc. In addition, a variety of extender pigments, etc. can be used together.

In this case, contents of the pigments (PWC) are preferably less than 50%, further preferably less than 30%. When it exceeds 50%, appearance of coating becomes deteriorated.

The intermediate coating composition may appropriately contain, besides the aforementioned components, sedimentation preventives (suspending agents) such as polyamide wax which is a lubricant dispersion of aliphatic amide, and polyethylene wax which is a colloidal dispersion comprising polyethylene oxide as the main ingredient, ultraviolet ray absorbent, antioxidant, leveling agent, surface adjusting agent such as silicone and organic polymers, antisagging agent, thickening agent, antifoaming agent, lubricant, cross-linking polymer particles (microgel), etc. These additives may be usually combined in less than 15 parts by weight respectively per 100 parts by weight of the resins and cross-linking agent in total to improve the performances of coating.

Usually, to the intermediate coating composition are provided the components in a state dissolved or dispersed in a solvent. As a solvent, any organic solvents and/or water can be used so far as they are able to dissolve or disperse those vehicles. Organic solvents can be exemplified by any one usually used in the field of coating including hydrocarbons such as toluene, xylene, etc., ketones such as acetone, methyl ethyl ketone, etc., esters such as ethyl acetate, cellosolve acetate, butyl cellosolve, etc., alcohols, etc. In the case where use of an organic solvent is restricted from the viewpoint of environmental protection, water is preferably used. In this case, a hydrophilic organic solvent may be included in an appropriate amount thereof.

Method for Forming Multilayered Coating Films and Multilayered Coating Films

A method for forming multilayered coating films according to the present invention is a method wherein an intermediate coating film is made on a previously undercoated base material, followed by a formation of a top coating film to provide multilayered coating films.

In the case where a base material to be coated is an automobile body or parts thereof, it is preferable that an undercoating film has been previously formed on the base material to be coated with the base coating by the electrodeposition coating method, etc. after the chemical treatment thereof. Examples of resins as a major component of electrodeposition coat used in the electrodeposition coating are liquid rubbers (those having epoxy resin as a structural skeleton such as maleic acid resin, maleic acid polybutadiene resin, and amino-epoxy polybutadiene resin, etc. depending on the situation) such as drying oil or polybutadiene, etc., resins having the fatty acid esters of resinous polyols as the main structural skeleton, etc. In the case where the electrodeposition coating resin is acidic resin, it is preferable to neutralize it with bases such as ammonia, amines, inorganic alkalis, etc. prior to its dissolution or dispersion in water. And, when the resin is basic, it is preferable to neutralize it with acids such as acetic acid, boric acid, phosphoric acid, etc. prior to its dissolution or dispersion in water. Into the electrodeposition coating, cross-linking agents such as melamine resin, block polyisocyanate, additives such as pigments, solvents, etc. may be appropriately combined. It is desirable that electrodeposition coating film is so arranged that the coating film usually becomes 10–40 $\mu$m thick after baking. Other conditions in the electrodeposition coating. may be in accordance with conventional conditions in the electrodeposition coating.

Multilayered coating films of the present invention are multilayered coating films obtained by the method for forming multilayered coating films.

The multilayered coating films can be formed on a variety of base materials to be coated. In this case, examples of specific coating base materials are metals such as iron, aluminum, copper or alloys thereof, inorganic materials such as glass, cement, concrete, etc., resins such as polyethylene resin, polypropylene resin, ethylene-vinyl acetate copolymer resin, polyamide resin, acrylic resin, vinylidene chloride resin, polycarbonate resin, polyurethane resin, epoxy resin, etc., plastic materials such as various FRPs, etc., in addition, natural materials such as woods, fibrous materials (paper, fabrics, etc.) or synthetic materials, etc. In this specification, the base materials to be coated on which undercoating film has been formed by chemical treatment or undercoating, etc. may be sometimes referred to as base materials to be coated.

An intermediate coating composition of this invention is applied to the base materials to be coated to build an intermediate coating film. In the case where the base materials to be coated have been undercoated with undercoating, etc., the intermediate coating may be applied onto the undercoating film in a wet-on-wet or wet-on-dry manner. Intermediate coating film can be baked, together with undercoating film or after curing the undercoating film, at 120–160° C. for a predetermined time to build the intermediate coating film.

There is no limitation in the method for forming the intermediate coating film on base materials to be coated, and spraying method, roll-coater method, etc. are preferably employed, and multiple coatings are also possible. The intermediate coating film is preferably 5–50 $\mu$m thick per one coating after dried, further preferably 10–30 $\mu$m thick.

As a top coating used in a method for forming a multilayered coating of the present invention, a mixture of at least one kind of thermosetting resin selected from a group of acrylic resin, polyester resin, fluororesin, epoxy resin, polyurethane resin, polyether resin, modified resins thereof, etc. and a variety of cross-linking agents, as well as various pigments may be used. These resins may be in any form, either in an organic solvent-soluble or aqueous form, or in a powder form. Conditions for top coating may be the same as those specified for conventional top coating of automobiles.

Furthermore, in the case where a clear coat is formed as a top coat over the base coat in the top coating, a coating generally used as the top coating may be employed as a clear coating. A clear coating comprising a polymer containing carboxyl groups and polymer containing epoxy groups, which has been disclosed in Japanese Patent Publication No. Hei8-19315, is preferably used from a view point of countermeasure against acid rain hazard. Furthermore, these top coatings may be combined with additives such as modifier, ultraviolet ray absorbent, leveling agent, dispersant, antifoaming agent, etc. as the occasion demands.

A top coating in a method for forming multilayered coating films can be obtained by baking the top coating film at 120–160° C. for a predetermined time. Furthermore, in the case where top coating film comprises a base coat and clear coat, although top coating may be applied after curing the base coat, it is preferable to apply a clear coating to the base coat in the uncured state or semi-cured state in a similar wet-on-wet manner as described above. In the case of multiple application of clear coatings, baking may be simultaneously performed after the final clear coating, a complete curing at stages of early clear coat applications being not required. Clear coat thus built with clear coating by the wet-on-wet method is baked together with base coat at 120–160° C. for a predetermined time to give rise a coating film. In this case, the dried top coating film is preferably 10–80 μm thick per one coat, further preferably 20–50 μm thick.

EXAMPLES

The present invention is more specifically described below with reference to examples, but should not be construed being limited thereto.

Manufacturing Example 1
Manufacturing of High-acid-value Polyester Resin (Lactone-modified Polyester Resin) (P1)

In a 2-liter flask equipped with a stirrer, nitrogen inlet pipe, temperature controller, condenser and decanter were placed trimethylpropane (310 parts), neopentyl glycol (310 parts) and 1,6-hexanediol (188 parts), and the mixture was dissolved by heating it to 80–100° C. Stirring was initiated at the point that it became possible, and isophthalic acid (707 parts) and adipic acid (155 parts) were further added to the mixture, and the reaction temperature was elevated to 180° C. When the reaction condensation water began to be produced, the reaction temperature was raised to 230° C. over 3 h at a constant rate while the water being distilled off to outside the system, and, once the temperature reached 230° C., the reaction was continued at that temperature for further 1.5 h. Then, after xylene was added into the flask, the condensation reaction was continued under refluxing xylene, and terminated when the acid value of the resin reached 20, then cooled. After cooling, xylene (600 parts) was added to prepare an oil-free polyester resin varnish. The resinous solid part thus obtained contained the non-volatile fraction at 70.4%, having the acid value of 20 and hydroxyl value of 120. To this resinous solid fraction (974 parts) were added ε-caprolactone (146 parts) and tin di-n-butyl dilaurate (0.4 parts), and the mixture was heated to 150° C. in a nitrogen atmosphere. While maintaining the mixture at this temperature, samples were withdrawn at intervals to monitor the amount of unreacted ε-caprolactone by IR, and the reaction was terminated when the reaction reached a 98% completion, then the mixture was cooled. When the temperature inside the flask lowered to 135° C., xylene (480 parts) was added to obtain the lactone-modified polyester resinous varnish. This varnish contained a non-volatile fraction at 70.2%, having a number-average molecular weight of about 3000, vanish acid value of 20 and hydroxyl value of 100.

Manufacturing Example 2
Manufacturing of Low-acid-value Polyester Resin (P2)

In a 2-liter flask equipped with a stirrer, nitrogen inlet pipe, temperature controller, condenser and decanter were placed trimethylpropane (310 parts), neopentyl glycol (310 parts) and 1,6-hexanediol (188 parts), and the mixture was dissolved by its heating to 80–100° C. Stirring was initiated at the point that it became possible, and isophthalic acid (707 parts) and adipic acid (155 parts) were further added to the mixture, and the reaction temperature was elevated to 180° C. When the reaction condensation water began to be produced, the reaction temperature was raised to 230° C. over 2 h at a constant rate while the water being distilled off to outside the system, and, once the temperature reached 230° C., the reaction was continued at that temperature for further 3 h. Then, after xylene was added into the flask, the condensation reaction was continued under refluxing xylene, and terminated when the acid value of resin reached 8, then cooled. After cooling, xylene (600 parts) was added to prepare an oil-free polyester resin varnish. The resinous solid fraction thus obtained contained the non-volatile fraction at 70.4%, having a number-average molecular weight of about 3000, acid value of 8 and hydroxyl value of 100.

Examples 1–8 and Comparative Examples 1–7
Preparation of Intermediate Coating Composition As shown in Table 1, a predetermined number of polyester resins were prepared, combined with cross-linking agents, pigments and additives in proportions specified in Table 1, mixed under stirring with organic solvents (toluene/xylene/ethyl acetate/butyl acetate=70/15/10/5 by weight) using a stirrer until the viscosity suitable for coating is reached to obtain intermediate coating compositions 1–11. In this case, intermediate coating compositions 7–11 are for comparative examples.

TABLE 1

| | | | Intermediate coating composition (No. 1~6: for Examples/No. 7~11: for Comparative Examples) | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Vehicle | High-acid-value polyester resin | Acid value ($AV_1$) | 20 | 20 | 20 | 20 | 15 | 36 | 20 | — | 8 | 35 | 20 |
| | | Hydroxyl value | 100 | 100 | 100 | 100 | 100 | 100 | 100 | — | 100 | 100 | 100 |
| | | $M_n$ | 3000 | 3000 | 3000 | 3000 | 3000 | 3000 | 3000 | — | 3000 | 3000 | 3000 |
| | | Blending amount (P1) | 50 | 50 | 30 | 90 | 50 | 50 | 100 | — | 50 | 50 | 50 |
| | Low-acid-value polyester resin | Acid value ($AV_2$) | 8 | 8 | 8 | 8 | 10 | 8 | — | 8 | 8 | 5 | 8 |
| | | Hydroxyl value | 100 | 100 | 100 | 100 | 100 | 100 | — | 100 | 100 | 100 | 100 |
| | | $M_n$ | 3000 | 3000 | 3000 | 3000 | 3000 | 3000 | — | 3000 | 3000 | 3000 | 3000 |
| | | Blending amount (P2) | 50 | 50 | 70 | 10 | 50 | 50 | — | 100 | 50 | 50 | 50 |

TABLE 1-continued

| | | | Intermediate coating composition (No. 1~6: for Examples/No. 7~11: for Comparative Examples) | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | $AV_1/AV_2$ | | 2.5 | 2.5 | 2.5 | 2.5 | 1.5 | 4.5 | — | — | 1 | 7 | 2.5 |
| | (P1)/(P2) | | 50/50 | 50/50 | 30/70 | 90/10 | 50/50 | 50/50 | — | — | 50/50 | 50/50 | 50/50 |
| | melamine resin containing imino groups | Blending amount | 67 | 33.5 | 67 | 67 | 67 | 67 | 67 | 67 | 67 | 67 | 0 |
| | melamine resin containing metirol groups | Blending amount | 0 | 33.5 | 0 | 0 | 0 | 0 | 0 | 0 | 0 | 0 | 67 |
| Curing catalyst | | Blending amount | — | 0.1 | — | — | — | — | — | 0.1 | 0.1 | 0.1 | 0.1 |
| Pigment | $TiO_2$ | Blending amount | 80 | 80 | 80 | 80 | 80 | 80 | 80 | 80 | 80 | 80 | 80 |
| | Extender pigment | Blending amount | 31 | 31 | 31 | 31 | 31 | 31 | 31 | 31 | 31 | 31 | 31 |
| Additive | Surface adjuster | Blending amount | 0.5 | 0.5 | 0.5 | 0.5 | 0.5 | 0.5 | 0.5 | 0.5 | 0.5 | 0.5 | 0.5 |
| | Sedimentation preventive | Blending amount | 0.5 | 0.5 | 0.5 | 0.5 | 0.5 | 0.5 | 0.5 | 0.5 | 0.5 | 0.5 | 0.5 |

A blending amount is expressed in a solid portion by weight.

Preparation of Base Materials to be Coated

A dull steel plate (0.8 mm thick) having vertical and horizontal surfaces was degreased, chemically modified using a zinc phosphate treatment agent ("SURFDINE SD2000", Nippon Paint) and subjected to electrodeposition coating with a cationic electrodeposition coating ("POWERTOP U-50", Nippon Paint) so as to form a dried coating film 25 μm thick. Then, after baking at 160° C. for 30 min, an intermediate coating composition shown in Table 1 was air-sprayed so as to make the dried coating film 40 μm thick, which was baked at 140° C. for 15 min to form an intermediate coating film, thereby preparing a base material to be coated having an intermediate coating film formed.

Top Coating Film

To a base material on which the intermediate coating film had been formed, the top base coating 1 shown in Table 2 was spray-coated so that the coating film became 15 μm thick after drying, and allowed to stand for 3 min after the formation of the first base coat. The clear coat 1 or 2 shown in Table 2 was then formed so as to make the dried coating film 35 μm thick, allowed to stand for 10 min at room temperature, and then baked at 140° C. for 30 min. Furthermore, in Example 8 and Comparative Example 7, the top solid coating 1 was spray-coated so that the dried coating film became 40 μm thick, allowed to stand for 10 min, and then baked at 140° C. for 30 min. Adhesion between the intermediate coating film and top coating film of the multilayered coating films thus obtained, coating film outward appearance of the vertical surface, coating storage stability and process-shortening effects were assessed by the following assessment methods, the results being shown in Table 2.

In this case, in the top coating used, as a top base coating was used the top base coating 1 ("SUPERLAC M-90 Silver", Nippon Paint) comprising acrylic resin and melamine resin as a vehicle containing aluminum flakes as a sheen pigment, and, as a clear coating were employed the following two kinds: the top clear coating 1 ("SUPERLAC O-130 Clear", Nippon Paint) comprising acrylic resin and melamine resin or the top clear coating 2 ("MACFLOW O-520 Clear", Nippon Paint) comprising carboxyl group-containing polymer and epoxy group-containing polymer. Furthermore, as a top solid coating was used the solid coating 1 ("ORGA WHITE", Nippon Paint) comprising acrylic resin and melamine resin as a vehicle and titanium dioxide as a coloring pigment.

Assessment Method

Adhesiveness

A test piece after the formation of multilayered coating having 100 of 1-mm squares (100/cm$^2$) cut penetrating to the coated base material was subjected to the tape test (cross-cut test) according to JIS K5400 using a cellophane adhesive tape to measure the number of peeled squares, and assessed as follows:

3 No square is peeled,

2 Peeled squares: 1–10, and

1 Peeled squares: 11 or more.

Appearance of Coating Film

After the formation of multilayered coating, undulations on the vertical surface of cured coating film were assessed with the eye.

3 Coating film was in a state wherein no undulation was observed,

2 Coating film was in a state wherein a slight undulation was observed, and

1 Coating film was in a state wherein undulations were clearly observed.

Storage Stability of Coating

A preparation of intermediate coating composition was stored at 60° C. for one month, and then assessed for the extent of its viscosity elevation as follows:

3 Almost no elevation in viscosity was observed.

2 Slight elevation in viscosity was observed so that a small amount of viscosity adjuster was required, 1 Significant elevation in viscosity was observed so that a large amount of viscosity adjuster was required.

Process-shortening Effects

Under the conditions at 140° C. for 15 min, the above-described adhesiveness (adhesion), appearance of coating film on the vertical surface, and storage stability were assessed for the practical usefulness.

○ No practical problem about results of any assessments on the adhesiveness, appearance of coating film on the vertical surface and storage stability, X Practical problems about any of assessments on the adhesiveness of intermediate coating film to the top coating film, appearance of coating film on the vertical surface and storage stability.

TABLE 2

|  |  | Intermediate coating No. | Top coat solid coating No. | Top coat base coat No. | Top coat clear coat No. | Adhesiveness | Appearance of coatings | Coating storage stability | Process shortening effect |
|---|---|---|---|---|---|---|---|---|---|
| Example | 1 | 1 | — | 1 | 1 | 3 | 3 | 3 | ○ |
|  | 2 | 2 | — | 1 | 1 | 3 | 2–3 | 2–3 | ○ |
|  | 3 | 3 | — | 1 | 1 | 3 | 3 | 3 | ○ |
|  | 4 | 4 | — | 1 | 1 | 2–3 | 2–3 | 2–3 | ○ |
|  | 5 | 5 | — | 1 | 1 | 3 | 3 | 3 | ○ |
|  | 6 | 6 | — | 1 | 1 | 2–3 | 2–3 | 2–3 | ○ |
|  | 7 | 1 | — | 1 | 2 | 3 | 3 | 3 | ○ |
|  | 8 | 1 | 1 | — | — | 3 | 3 | 3 | ○ |
| Comparative Example | 1 | 7 | — | 1 | 1 | 2 | 2 | 2 | X |
|  | 2 | 8 | — | 1 | 1 | 1 | 3 | 3 | X |
|  | 3 | 9 | — | 1 | 1 | 1 | 3 | 3 | X |
|  | 4 | 10 | — | 1 | 1 | 2 | 2 | 2 | X |
|  | 5 | 11 | — | 1 | 1 | 2 | 2 | 1–2 | X |
|  | 6 | 7 | — | 1 | 2 | 2 | 2 | 2 | X |
|  | 7 | 7 | 1 | — | — | 2 | 2 | 2 | X |

As clearly understood from the results in Table 2, in the present example, a coating film was formed by a method for forming multilayered coating films according to this invention, wherein, while shortening of baking period was arranged, appearance of coating film and adhesion of the intermediate coating to the top coating were both excellent. Furthermore, the intermediate coating composition was satisfactory in its storage stability. On the other hand, in comparative examples, satisfactory state could not be obtained in any of adhesion to the top coating film, appearance of coating film on the vertical surface or storage stability of the intermediate coating composition, so that shortening of baking period could not be achieved.

Advantageous Effect of the Invention

In the present invention, a ratio ($AV_1/AV_2$) of acid value ($AV_1$) of high-acid-value polyester resin to that ($AV_2$) of low-acid-value polyester resin was adjusted to be 1.25–5, and also, as a cross-linking agent melamine resin, melamine resin containing an imino group was used, so that, because of the curing reaction being stabilized, multilayered coating films formed even under the conditions of short-time baking was excellent in the appearance of coating film and adhesion to the top coating, and the intermediate coating composition was able to maintain its storage stability excellent, as a result, it became possible to shorten the coating processes.

Furthermore, since multilayered coating films obtained by the present invention is excellent in the adhesiveness and appearance of coating film, it is preferably used in the field of outer plates of vehicles such as automobiles, motorcycles, etc., outer surface of vessels, coilcoating, home electric appliance industry, etc.

What is claimed is:

1. An intermediate coating composition comprising a high-acid-value polyester resin, a low-acid-value polyester resin, a melamine resin containing imino groups and a pigment, wherein the ratio ($AV_1/AV_2$) of the acid value of the high-acid-value polyester resin ($AV_1$) to that ($AV_2$) of the low-acid-value polyester resin is in the range of 1.25–5.0.

2. The intermediate coating composition according to claim 1 wherein the intermediate coating composition is free of an acid catalyst for promoting reaction of said melamine resin with said high-acid-value polyester resin and said low-acid-value polyester resin.

3. The intermediate coating composition according to claim 1, wherein the weight ratio (P1/P2) of said high-acid-value polyester resin (P1) to said low-acid-value polyester resin (P2) is as follows: P1/P2=30/70–90/10.

4. The intermediate coating composition according to claim 1, wherein said high-acid-value polyester resin has a number-average molecular weight in the range of 2,000–4,000, hydroxyl group value in the range of 90–120, and acid value in the range of 15–40.

5. The intermediate coating composition according to claim 1, wherein said high-acid-value polyester resin is a lactone-modified polyester resin, the lactone content in said lactone-modified polyester resin being in the range of 10–30 percent by weight as converted to solid portions.

6. The intermediate coating composition according to claim 1, wherein said low-acid-value polyester resin has a number-average molecular weight in the range of 2,000–4,000, a hydroxyl group value in the range of 90–120, and an acid value in the range of 5–12.

7. The intermediate coating composition according to claim 1, wherein said melamine resin containing an imino group is a methyl/butyl mixed alkylated melamine resin containing imino groups, methylated melamine resin containing imino groups or butylated resin containing imino groups.

8. The intermediate coating composition according to claim 1 wherein the melamine resin contains 50–100 percent by solid weight of a methyl/butyl mixed alkylated resin containing imino groups.

9. A method for forming a multilayered coating film, comprising the steps of:
 (1) forming an intermediate coating composition on undercoated base material, wherein the intermediate coating composition comprises a high-acid-value polyester resin, a low-acid-value polyester resin, a melamine resin containing imino groups and a pigment, wherein the ratio ($AV_1/AV_2$) of the acid value of the high-acid-value polyester resin ($AV_1$) to that ($AV_2$) of the low-acid-value polyester resin is in the range of 1.25–5.0; and
 (2) forming a top coating.

10. A multilayered coating film formed by a method comprising the steps of:

(1) forming an intermediate coating composition on undercoated base material, wherein the intermediate coating composition comprises a high-acid-value polyester resin, a low-acid-value polyester resin, a melamine resin containing imino groups and a pigment wherein the ratio ($AV_1/AV_2$) of the acid value of the high-acid-value polyester resin ($AV_1$) to that ($AV_2$) of the low-acid-value polyester resin is in the range of 1.25–5.0; and (2) forming a top coating.

* * * * *